United States Patent [19]
Alten et al.

[11] Patent Number: 5,560,063
[45] Date of Patent: Oct. 1, 1996

[54] LOADING BRIDGE FOR RAMPS

[75] Inventors: Kurt Alten, Ringstr. 14, D-30974 Wennigsen; Horst Borchardt, Wennigsen, both of Germany

[73] Assignee: Kurt Alten, Wennigsen, Germany

[21] Appl. No.: 405,902

[22] Filed: Mar. 17, 1995

[30] Foreign Application Priority Data

Mar. 18, 1994 [DE] Germany ............. 44 09 345.4

[51] Int. Cl.$^6$ ....................................... E01D 1/00
[52] U.S. Cl. .................... 14/69.5; 14/71.1; 14/71.3
[58] Field of Search ....................... 14/69.5, 71.1, 14/71.3, 71.5, 71.7; 248/591, 595, 598

[56] References Cited

U.S. PATENT DOCUMENTS

| | | | |
|---|---|---|---|
| 4,525,887 | 7/1985 | Erlandsson et al. | 14/71.1 |
| 4,619,008 | 10/1986 | Kovach et al. | 14/71.1 |
| 5,313,681 | 5/1994 | Alexander | 14/71.1 |

FOREIGN PATENT DOCUMENTS

| | | | |
|---|---|---|---|
| 4231476 | 10/1993 | Germany | 14/69.5 |

Primary Examiner—David J. Bagnell
Assistant Examiner—Pamela A. O'Connor
Attorney, Agent, or Firm—Robert W. Becker & Associates

[57] ABSTRACT

A loading bridge for ramps has a bridge plate having a forward and a rearward end and connected with the rearward end to the ramp so as to be pivotable about a horizontal axis. An extension is connected to the forward end of the bridge plate so as to be extendable from an initial position into an extended position for supporting the bridge plate on a platform to be loaded and unloaded and retractable from the extended position into the initial position. At least one support leg with an upper and a lower end is provided for supporting the bridge plate in a rest position. The support leg is pivotably connected to the bridge plate such that the lower end swivels upwardly toward the rearward end of the bridge plate when the extension is extended. The support leg has at the upper end an end face for supporting a downwardly extending part of the bridge plate. The support leg has at the upper end a holding member extending upwardly toward the bridge plate for pivotably connecting the upper end to the bridge plate.

12 Claims, 1 Drawing Sheet

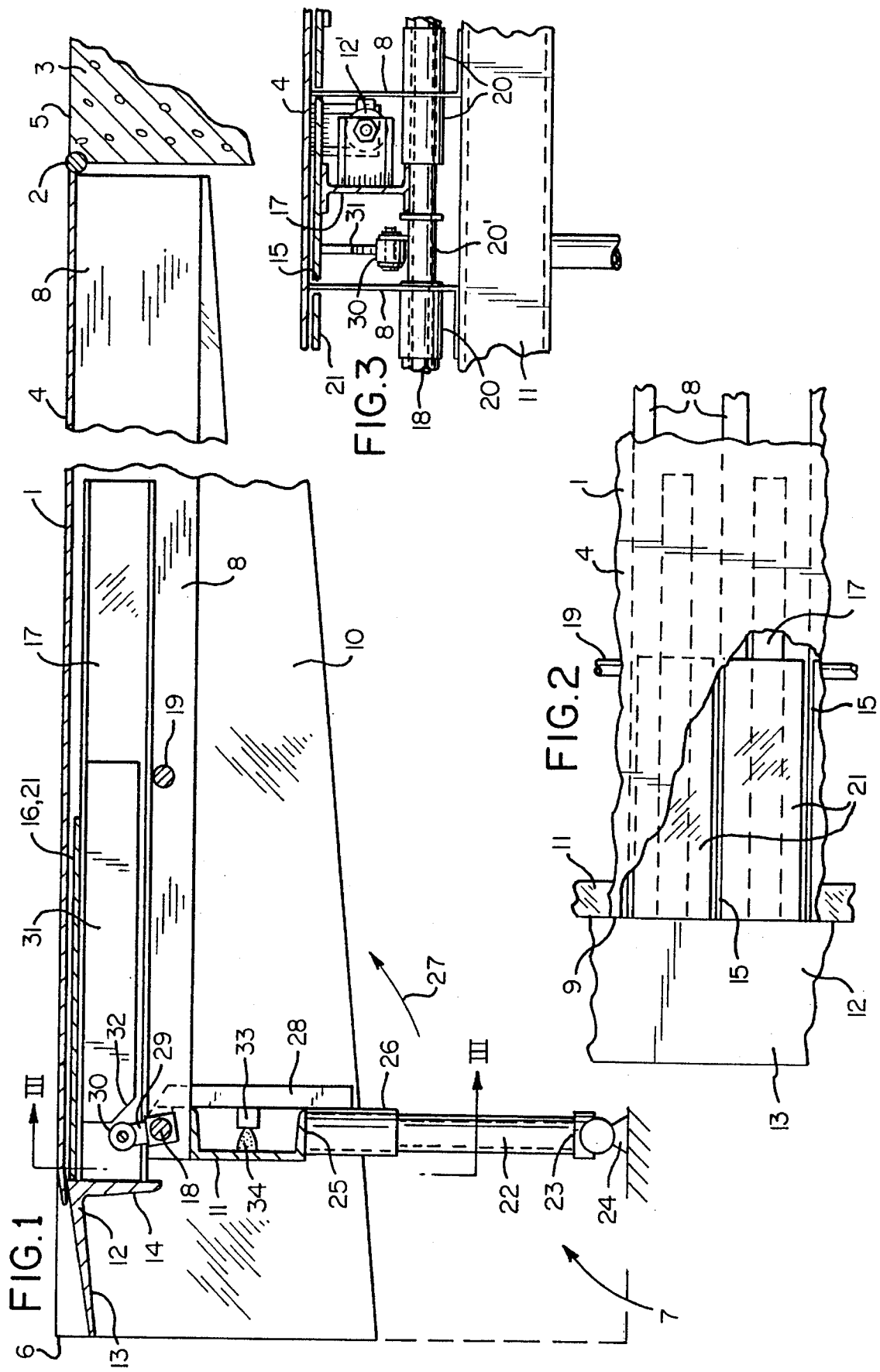

LOADING BRIDGE FOR RAMPS

BACKGROUND OF THE INVENTION

The present invention relates to a loading bridge for ramps with a bridge plate that, with one end facing the ramp, is supported so as to be pivotable about a horizontal axle at the ramp and has an extension that is provided at the free end of the bridge plate. The extension is displaceable in the longitudinal direction of the bridge and can be extended and retracted for supporting the bridge plate on the vehicle platform that is to be loaded or unloaded. The loading bridge is furthermore provided with one or more support legs for supporting the bridge in its rest position. They can be swiveled about a horizontal axis, and, by displacing the extrusion, their lower end can swivel toward the rearward end of the loading bridge that faces the ramp.

With known loading bridges of this kind the bridge plate has a support at the level of the sliding member, respectively the plate member (extrusion) that carries out the extending movement. The resulting length of the support legs requires a respectively dimensioned design in order to achieve the necessary breaking strength. Particularly, the support legs require a special structural design when the loading bridge is being traveled across with heavy loads in its rest position and large support lengths are required.

The object of the present invention is to improve the above mentioned loading bridges such that the loading of the support legs is significantly reduced and thus support legs of smaller dimensions are able to carry greater loads.

SUMMARY OF THE INVENTION

A loading bridge for ramps according to the present invention is primarily characterized by:

- a bridge plate having a forward and a rearward end and connected with the rearward end to the ramp so as to be pivotable about a horizontal axis;
- an extension connected to the forward end of the bridge plate so as to be extendable from an initial position into an extended position for supporting the bridge plate on a platform to be loaded and unloaded and retractable from the extended position into the initial position;
- at least one support leg with an upper and a lower end for supporting the bridge plate in a rest position, the at least one support leg pivotably connected to the bridge plate such that the lower end swivels upwardly toward the rearward end of the bridge plate when the extension is extended;
- the at least one support leg having at the upper end an end face for supporting a downwardly extending part of the bridge plate; and
- the at least one support leg comprising at the upper end a holding member extending upwardly toward the bridge plate for pivotably connecting the upper end to the bridge plate.

The bridge plate preferably comprises bearing members and the downwardly extending part of the bridge plate is a cross beam positioned in the vicinity of the forward end beneath the bearing members for supporting the bearing members.

The loading bridge advantageously further comprises a transverse shaft extending parallel to the forward and the rearward ends. The extension expediently comprises a positioning lever for pivoting the at least one support leg. The positioning lever is fixedly connected to the transverse shaft and the holding member is fixedly connected to the transverse shaft.

In another embodiment of the present invention, the loading bridge further comprises a sleeve positioned on the upper end of the at least one support leg, wherein the holding member is connected to the sleeve.

The support leg and the sleeve are preferably displaceable relative to one another.

The loading bridge advantageously further comprises an elastic abutment for cooperating with the holding member.

Preferably, the at least one support leg is tubular.

The transverse shaft is expediently pivotably supported on the cross beam.

The holding member is connected laterally to the support leg and extends parallel to the support leg.

The loading bridge further comprises a bearing for supporting the lower end of the at least one support leg. The lower end engages the bearing in a form-locking connection such that a pivoting of the at least one support leg is possible only after a lifting of the bridge plate resulting in a release of the form-locking connection has taken place.

The lower end of the support leg substantially has a concave shape and the bearing substantially has a matching convex shape for providing the form-locking connection.

In another embodiment of the present invention, the loading bridge for ramps is characterized by:

- a bridge plate having a forward and a rearward end and connected with the rearward end to the ramp so as to be pivotable about a horizontal axis;
- an extension connected to the forward end of the bridge plate so as to be extendable from an initial position into an extended position for supporting the bridge plate on a platform to be loaded and unloaded and retractable from the extended position into the initial position;
- at least one support leg with an upper and a lower end for supporting the bridge plate in a rest position, the at least one support leg connected to the bridge plate so as to be pivotable about a horizontal axis such that the lower end swivels upwardly toward the rearward end of the bridge plate when the extension is extended;
- the bridge plate comprising bearing members and a cross beam positioned in the vicinity of the forward end beneath the bearing members for supporting the bearing members;
- the at least one support leg having at the upper end an end face on which the cross beam is supported in the rest position; and
- the at least one support leg comprising at the upper end a holding member, extending upwardly past the cross beam, for pivotably connecting the upper end to the bridge plate.

According to the invention, the support legs, with their upper end face, support a downwardly projecting part of the bridge plate which extends downwardly in the direction of the base of the ramp cutaway portion. They are additionally provided with a holding member that extends upwardly toward the pivot point and that exclusively serves as an attachment. Expediently, the support legs are then arranged such that, at the forward end of the bridge plate, they support the cross beam which supports the bearing members of the bridge plate since this cross beam, on the one hand, is sufficiently stiff and, on the other hand, is a structural end member at the bottom of the bridge plate.

Accordingly, the support legs can be designed relatively short and compact; however, they have a breaking strength that is sufficient for carrying greater loads. However, this effect is only possible because a holding member is provided for the attachment of the support legs and its only purpose is to hold the support legs when they are in the rest position. The holding member can therefore be a light-weight bar that extends to the pivot point.

BRIEF DESCRIPTION OF THE DRAWINGS

The object and advantages of the present invention will appear more clearly from the following specification in conjunction with the accompanying drawings, in which:

FIG. 1 illustrates a loading bridge for ramps in its rest position, in a longitudinal sectional view;

FIG. 2 illustrates a partial plan view of the bridge according to FIG. 1; and

FIG. 3 illustrates a cross-section, viewed along line III—III of FIG. 1.

DESCRIPTION OF PREFERRED EMBODIMENTS

The present invention will now be described in detail with the aid of several specific embodiments utilizing FIGS. 1–3.

With its end facing the ramp, the bridge plate is pivotable about a horizontal axle 2 that is supported at the ramp 3. In the rest position its sheet metal cover 4 is flush with the surface 5 and the front edge 6 of the ramp 3. At the ramp 3 a cutaway portion 7 is provided that corresponds to the size of the bridge plate 1 and into which the bridge plate 1 can be retracted. For swiveling the bridge plate 1 working cylinders are required which are not illustrated.

For reinforcing the bridge plate 1 a number of bearing members 8 is provided which extend to the front edge of the bridge plate 1. The bridge plate 1 is shielded on both sides by metal side plates 10 which have an essentially triangular, respectively, trapezoidal shape, and which are designed for anchoring a cross beam 11 on which the bearing members 8 rest.

At the front end of the bridge plate 1 an extension 12 is provided, which has a support member 13 that can rest on the vehicle when the extension 12 is extended. When loading is finished, the extension 12 is retracted. For displacing the extension 12 a working cylinder is provided which is illustrated at 12'. A leg 14 projects perpendicularly to the support member 13. Toward the rear the support member 13 has a transition into a plate 16 which is provided with longitudinal slots 15. These slots 15 are penetrated by the bearing members 8. The plate sections 21 of the plate 16 which are positioned between the longitudinal slots 15 are supported by longitudinal support beams 17 which project past the plate 16 to the rear.

With their front end the longitudinal support beams 17 rest on a pivotable transverse shaft 18 that is supported on the cross beam 11 in bearing blocks which (not illustrated), but it can also be supported with its end portions at the metal side plates 10. As is illustrated in FIG. 3, the transverse shaft 18 also penetrates the bearing members 8. In the rear area the longitudinal support beams 17 rest on a transverse round bar 19 that also penetrates the bearing members 8. There, as well as on the shaft 18, spacing sleeves 20 are provided for lateral guiding the longitudinal support beams 17.

According to FIG. 1 the forward end of the bridge plate 1 is secured by support legs 22, namely by one support leg 22 at one corner of the bridge plate 1 and the second support leg 22 at the opposite corner. Their lower ends rest with a concave footing member 23 on a bearing 24 that is provided at the base of the cutaway portion 7. With their upper end face 25 the support legs 22 support the cross beam 11. By this means the loading bridge 1 is secured against lowering when the sheet metal cover 4 is being traveled.

The support legs 22 are relatively short since among all members of the bridge plate 1 the cross beam 11 extends farthest downward into the direction of the above mentioned base. A tube or tubular structure is sufficient as a support leg member.

At the upper section of the support legs 22 a sleeve 26 is provided at which a holding member 28 engages for securing and swiveling the support legs 22 in the direction of the arrow 27; the holding member 28 is mounted on a spacing sleeve 20 which is fixedly connected to the shaft 18.

Beneath the bridge plate 1, approximately positioned centrally at the front end of the bridge plate, a spacing sleeve 20' is provided that is fixedly connected to the shaft 18; this spacing sleeve 20' is engaged by a positioning lever 29 that in the rest position extends upwardly and has a roller 30 at its free end such that a swiveling movement of the positioning lever 29 forwardly toward the extension 12 results in the swiveling of the support legs 22 in the direction of the arrow 27.

In order for this swiveling movement to be carried out automatically together with the extending movement of the extension 12, a plate section 21 is provided with a downwardly projecting beam 31 that has a slanted contact section at its front end. When the extension 12 is displaced, the projecting beam 31 effects a swiveling movement of the positioning lever 29. Thus, the desired swiveling movement of the support legs 22 in the direction of the arrow 27 is carried out; now, the bridge plate 1 can slide deeply into the cutaway portion 7 without being hindered by the support legs 22.

Of further importance is the fact that the support legs 22, once they are swiveled back upwardly, can swivel further upwardly when they hit a possible obstacle within the cutaway portion 7 since the projecting beam 31 prevents the support legs 22 from folding downwardly but cannot prevent a further swiveling movement of the support legs 22 in the direction of the arrow 27. But the weight of the support leg 22 always pulls the roller 30 against the projecting beam 31 in case that the resistance, respectively the obstacle within the cutaway portion 7, are no longer present.

Moreover, the sleeve 26 provides the possibility of adjusting the height of the support legs 22. However, in all of the adjusting positions of the sleeve 26 the weight of the bridge plate 1 should only be carried by the support leg 22; therefore, the only function of the holding member 28 is to guide and swivel the support legs 22 when they are to be swiveled.

The holding member 28 is also provided with a projection 33 that may hit an elastic pad 34 when the support leg 22 is returned.

When the extension 12 is retracted, the support legs 22 swivel back into the position according to FIG. 1 counter to the direction of the arrow 27, due to their specific gravity.

The shaft 18 thus has the particular advantage that it effects the actuation of the swiveling of the support legs 22, on the one hand, and, on the other hand, acts as a support for the extension 12. In this respect it performs two functions.

Instead of the embodiment of the footing member 23 and the bearing 24 according to FIG. 1, also a different form-locking connection can be employed, namely such that in the rest position of the bridge unauthorized persons are unable to push the support leg 22 inwardly for swivelling the bridge plate 1 and being able to intrude the building. Since there is a closed gate above the bridge plate 1 when it is not operated, the bridge plate 1 cannot be lifted; thus the form-locking connection at the footing member 23 cannot be released and the unauthorized swiveling of the support leg 22 cannot take place. On initiating operation of the bridge, the bridge plate 1 can then be lifted to a small extent without difficulty and swiveling of the support leg 22 can be effected by displacing the extension 12.

The present invention is, of course, in no way restricted to the specific disclosure of the specification, examples, and drawings, but also encompasses any modifications within the scope of the appended claims.

What we claim is:

1. A loading bridge for ramps, said loading bridge comprising:

a bridge plate having a forward and a rearward end and connected with said rearward end to the ramp so as to be pivotable about a horizontal axis;

said bridge plate comprising a downwardly extending cross beam connected at said forward end;

an extension connected to said forward end of said bridge plate so as to be extendable from an initial position into an extended position for supporting said bridge plate on a platform to be loaded and unloaded and retractable from said extended position into said initial position;

at least one support leg with an upper and a lower end for supporting said bridge plate in a rest position;

said at least one support leg pivotably connected to said bridge plate such that said lower end swivels upwardly toward the rearward end of the bridge plate when said extension is extended;

said at least one support leg having at said upper end an upwardly facing end face, wherein said cross beam rests on said end face in said rest position; and at least one holding member with a first and a second end, fixedly connected with said first end laterally to said upper end of said at least one support leg and extending in said rest position upwardly from said end face toward said bridge plate past said cross beam, wherein said second end is pivotably connected to said bridge plate above said cross beam.

2. A loading bridge according to claim 1, wherein said bridge plate comprises bearing members and wherein said cross beam is positioned beneath said bearing members for supporting said bearing members.

3. A loading bridge according to claim 2, further comprising a transverse shaft extending parallel to said forward and said rearward ends, wherein:

said extension comprises a positioning lever for pivoting said at least one support leg;

said positioning lever is fixedly connected to said transverse shaft; and said holding member is fixedly connected to said transverse shaft.

4. A loading bridge according to claim 3, wherein said transverse shaft is pivotably supported on said cross beam.

5. A loading bridge according to claim 1, further comprising a sleeve positioned on said upper end of said at least one support leg, wherein said holding member is connected to said sleeve.

6. A loading bridge according to claim 1, wherein said support leg and said sleeve are displaceable relative to one another.

7. A loading bridge according to claim 1, further comprising an elastic abutment for cooperating with said holding member.

8. A loading bridge according to claim 1, wherein said at least one support leg is tubular.

9. A loading bridge according to claim 1, wherein said holding member is connected laterally to said support leg and extends parallel to said support leg.

10. A loading bridge according to claim 1, further comprising a bearing for supporting said lower end of said at least one support leg, wherein said lower end engages said bearing in a form-locking connection such that a pivoting of said at least one support leg is possible only after a lifting of said bridge plate resulting in a release of said form-locking connection has taken place.

11. A loading bridge according to claim 10, wherein said lower end of said support leg substantially has a concave shape and wherein said bearing substantially has a matching convex shape for providing said form-locking connection.

12. A loading bridge for ramps, said loading bridge comprising:

a bridge plate having a forward and a rearward end and connected with said rearward end to the ramp so as to be pivotable about a horizontal axis;

an extension connected to said forward end of said bridge plate so as to be extendable from an initial position into an extended position for supporting said bridge plate on a platform to be loaded and unloaded and retractable from said extended position into said initial position;

at least one support leg with an upper and a lower end for supporting said bridge plate in a rest position, said at least one support leg connected to said bridge plate so as to be pivotable about a horizontal axis such that said lower end swivels upwardly toward the rearward end of the bridge plate when said extension is extended;

said bridge plate comprising bearing members and a downwardly extending cross beam positioned at said forward end beneath said bearing members for supporting said bearing members;

said at least one support leg having at said upper end an upwardly facing end face on which said cross beam is supported in said rest position; and at least one holding member, having a first and a second end, fixedly connected with said first end laterally to said upper end of said at least one support leg and extending in said rest position upwardly past said cross beam, wherein said second end is pivotably connected to said bridge plate.

* * * * *